United States Patent

Deglise-Favre et al.

Patent Number: 6,079,533
Date of Patent: Jun. 27, 2000

[54] FREEWHEEL DEVICE

[75] Inventors: Jean-Marc Deglise-Favre, Le Viviers-du-Lac; Marc Le-Calve, Saint-Cyr sur Loire; Eric Beghini, La Membrolle, all of France

[73] Assignee: SKF France, France

[21] Appl. No.: 08/943,153

[22] Filed: Oct. 3, 1997

[30] Foreign Application Priority Data

Oct. 14, 1996 [FR] France ................................. 96 12501

[51] Int. Cl.⁷ .......................... F16D 15/00; F16C 33/48
[52] U.S. Cl. ........................................ 192/45.1; 384/572
[58] Field of Search .................... 192/45.1, 41 A, 192/45; 384/572, 523, 477, 488; 277/630, 637

[56] References Cited

U.S. PATENT DOCUMENTS

| | | | |
|---|---|---|---|
| 3,954,161 | 5/1976 | Ehret et al. | 192/45 |
| 4,792,028 | 12/1988 | Nishimura et al. | 192/41 A |
| 5,018,753 | 5/1991 | Porel | 277/589 |
| 5,234,390 | 8/1993 | Malecha | 192/45.1 X |
| 5,320,204 | 6/1994 | Riggle et al. | 192/45.1 |
| 5,601,175 | 2/1997 | Kinoshita et al. | 192/45.1 X |
| 5,675,202 | 10/1997 | Zenmei et al. | 192/45 X |
| 5,725,221 | 3/1998 | Pekarsky et al. | 277/589 |
| 5,779,014 | 7/1998 | Kinoshita et al. | 192/45.1 X |

FOREIGN PATENT DOCUMENTS

| | | |
|---|---|---|
| 1203625 | 1/1960 | France . |
| 2407396 | 10/1978 | France . |
| 2601735 | 7/1986 | France . |

*Primary Examiner*—Charles A Marmor
*Assistant Examiner*—Roger Pang
*Attorney, Agent, or Firm*—Smith, Gambrell & Russell, LLP

[57] ABSTRACT

Freewheel device 1 intended to be inserted between the outer cylindrical surface of an inner race 3 and the bore of an outer race 2, of the type comprising a number of wedging cams 7 held, between sliding tracks 4, 6 of the races, by a cage 8 which has windows 9 for the cams 7, and at least one holding member 11a capable of transmitting radial loadings between said races while being force-fitted onto a cylindrical bearing surface 5a of one of the races and in sliding contact with a cylindrical bearing surface 3a of the other race. There are roughnesses where the first race 2 and the holding member 11a contact.

35 Claims, 3 Drawing Sheets

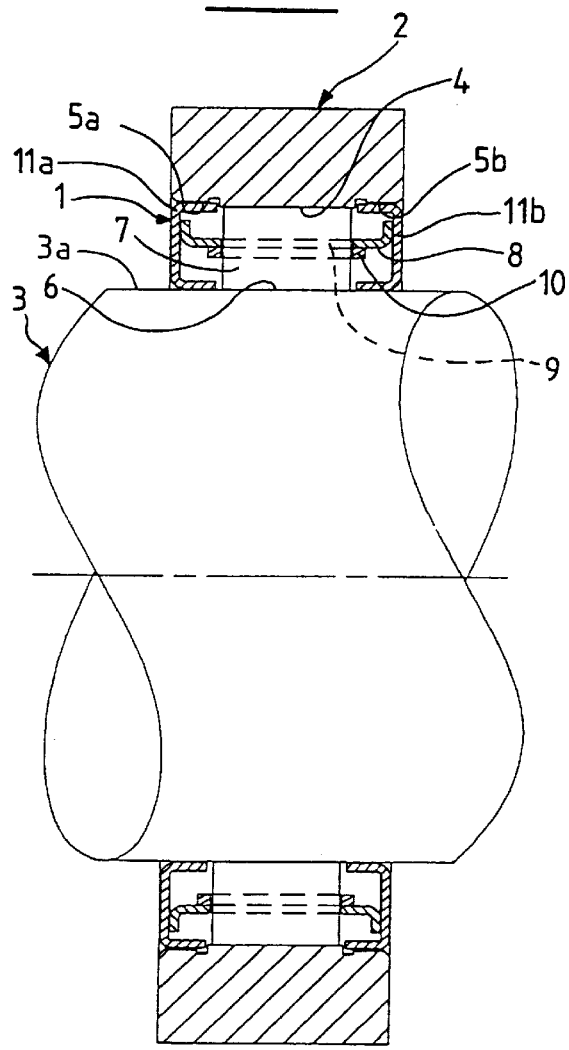
FIG_1
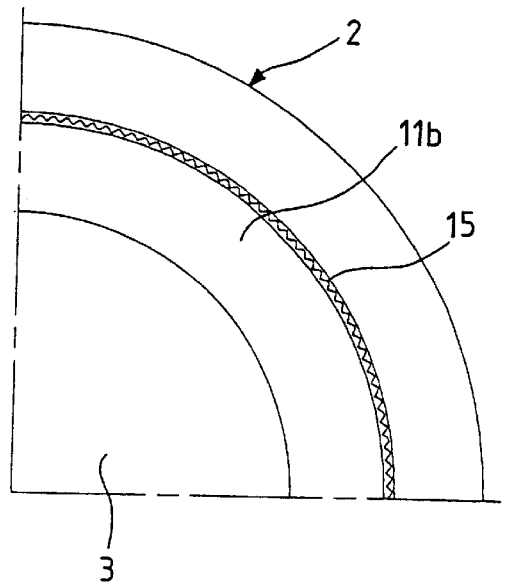
FIG_2

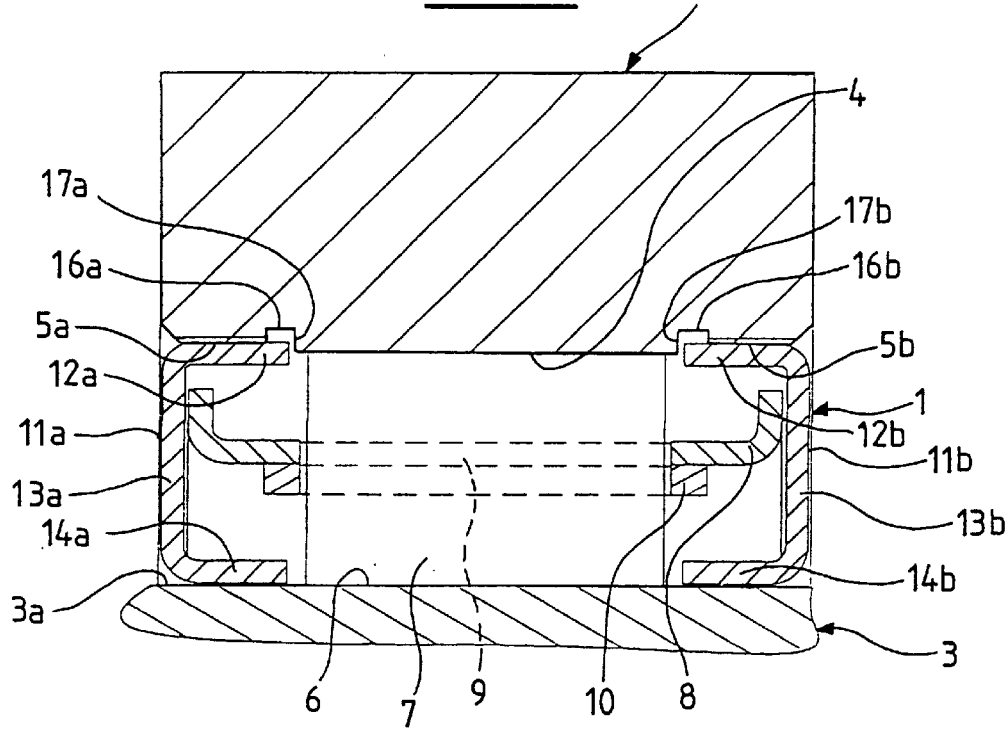
FIG_3
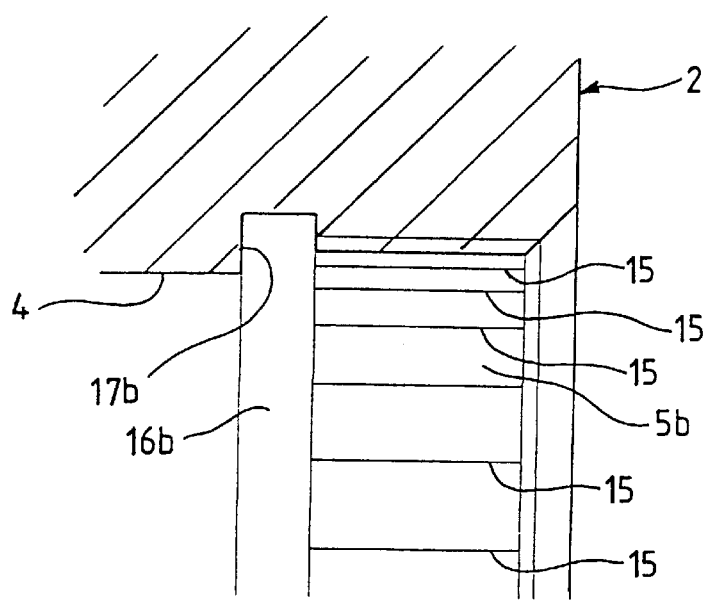
FIG_4

FIG_6
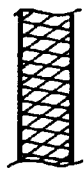
FIG_5
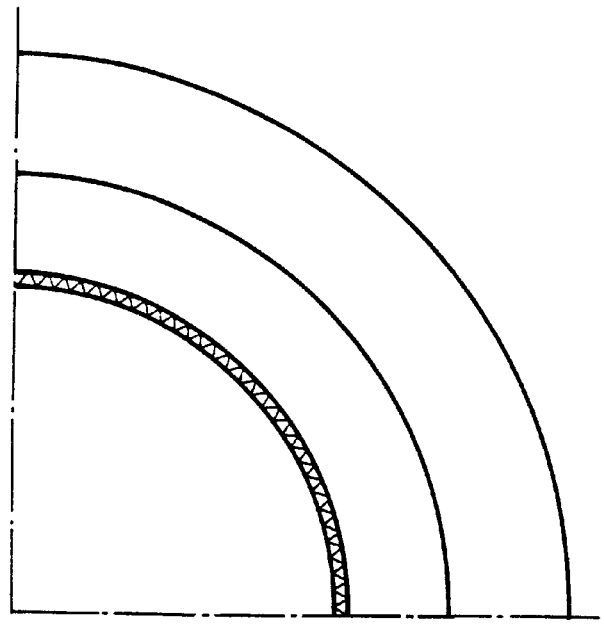

FREEWHEEL DEVICE

The present invention relates to the field of freewheels.

Freewheel devices generally comprise an outer race fitted with a cylindrical internal sliding track for the cams of the freewheel, an inner race or a shaft fitted with a cylindrical outer sliding track for said cams of the freewheel, a freewheel situated between the sliding track of the outer race and the sliding track of the inner race or of the shaft and one or more members forming a bearing and intended to maintain concentricity of the outer and inner races and to transmit radial loadings between said races. The freewheel comprises a cage with windows in which there are cams which, by wedging or sliding between the two tracks, provide a one-way coupling between said outer and inner races. The freewheel is thus capable in one direction of transmitting torque between the outer and inner races and, in the other direction, of allowing free rotation. To encourage the cams to tilt in the direction that favors wedging, a spring may be provided which is in the form of a band and exerts a return moment on each cam, tending to keep said cams in contact with the tracks. These freewheel devices are used in particular in the converters of automatic gearboxes.

To manufacture, it is often necessary, before and during assembly, for subassemblies consisting of the freewheel and at least one of the races to be handled. To make this handling easier and also to reduce wear on the freewheel, it is beneficial for the lateral bearings and one of the races to be secured together.

Document FR A 2 407 396 discloses a freewheel in which the lateral bearings are force-fitted onto a bearing surface of the outer race. Now, the races and the bearings may be made in various materials which have very different hardness, expansion, etc. properties and this may cause problems in securing the bearing and the race together, especially when working with variations of temperature.

The object of the present invention is therefore to provide a freewheel in which the way in which the bearings and the race are secured together can cope with these differences and in which these components are secured together during handling before assembly and also during operation even when there are thermal variations.

The freewheel device according to the invention is intended to be inserted between the outer cylindrical surface of an inner race and the bore of an outer race. The freewheel device is of the type comprising a number of wedging cams held, between sliding tracks of the races, by a cage which has windows for the cams, and at least one holding member capable of transmitting radial loadings between said races while being force-fitted onto a cylindrical bearing surface of one of the races and in sliding contact with a cylindrical bearing surface of the other race. There are roughnesses where the first race and the holding member contact. The holding member is thus perfectly secured to the first race irrespective of the variations in temperature.

In one embodiment of the invention, the cylindrical bearing surface of the first race has roughnesses.

Advantageously, the cylindrical bearing surface that has roughnesses of the first race has a different diameter than the sliding track of said first race and is separated from the latter by an annular cutout.

In one embodiment of the invention, the holding member comprises a cylindrical bearing surface that has roughnesses in contact with the cylindrical bearing surface of the first race.

The cylindrical bearing surface with roughnesses may be either on the bore of the outer race or on the outer cylindrical surface of the inner race. The term inner race applies both to an actual race and to a shaft that forms an inner race.

In one embodiment of the invention, the roughnesses are parallel and axial.

In another embodiment, the roughnesses are crossed, which makes it possible to obtain good securing both axially and in terms of rotation.

Advantageously, the roughnesses are on the hardest component. The roughnesses are preferably obtained by knurling. In a way which is itself known, knurling is an operation which consists in running a very hard knurling tool, the surface of which has closely spaced roughnesses (striations, spikes), along a softer surface while at the same time applying pressure so that the knurling tool marks said surface with an imprint of itself by plastic deformation, thus creating a multitude of roughnesses on a surface which was initially smooth.

The invention will be better understood from studying the detailed description of one embodiment taken by way of nonlimiting example and illustrated by the attached drawings in which:

FIG. 1 is a view in diametral section of a freewheel device according to the invention;

FIG. 2 is a partial side view of the wheel of FIG. 1;

FIG. 3 is a partial view of FIG. 1 showing the freewheel device in greater detail; and FIG. 4 is a partial view in diametral section of a striated freewheel outer race.

FIG. 5, shows a surface with criss-crossed striations; and

FIG. 6, shows roughness formed between an outer bearing surface of an inner race and the contacting surface of a holding member.

As can be seen from the figures, the freewheel device 1 is inserted between the bore of the outer race 2 and the outer cylindrical surface 3a of the shaft 3, which here acts as an inner race. The outer race 2 comprises, on its bore, a sliding track 4 and two cylindrical surfaces 5a and 5b arranged axially one on each side of the sliding track 4 and with a diameter which is slightly greater than this track. The shaft 3 on its outer cylindrical surface 3a has a sliding track 6. The freewheel device 1 comprises a row of cams 7 which is held by a cage 8 with windows 9 in which the cams 7 are arranged. A band-shaped spring 10 is provided to keep the cams 7 pressed against their sliding tracks 4 and 6. The cage 8 is held axially by two lateral bearings 11a and 11b.

As the two lateral bearings 11a and 11b are identical, only the bearing 11a will be described. The bearing 11a comprises a first cylindrical branch 12a force-fitted onto the cylindrical surface 5a of the outer race 2, a radial central portion 13a extending between the outer race 2 and the shaft 3, and a second cylindrical branch 14a in rubbing contact with the outer cylindrical surface 3a of the shaft 3. The bearing 11a is thus secured to the outer race 2 and keeps its concentricity with the shaft 3.

The outer race 2 is generally made of steel and the cylindrical surfaces 5a and 5b have a plurality of roughnesses in the form of axial striations 15. The roughnesses formed by the striations 15 on the surfaces 5a and 5b allow the bearings 11a and 11b to be secured more firmly to the outer race 2, the striations 15 biting into the outer surface of the bearings 11a and 11b. In the embodiment described, axial striations 15 are provided. However, if improved secureness in the axial sense is desired, for example if the freewheel device is likely to experience axial loadings or shocks, crossed striations or protuberances which improve the axial behavior of the bearings 13a and 13b may be provided. It is also possible to provide roughnesses on the outer surface of the branches 12a, 12b of the bearings 11a, 11b which would come into contact with the surfaces 5a, 5b which themselves have roughnesses 15, in order to improve the axial behavior of the bearings 11a, 11b still further.

As can be seen more particularly from FIG. 2, the outer surface of the bearings 11a and 11b, which are often made of a metal which is softer than the outer race 2, for example brass, deforms and adapts to the striations 15, which gives excellent secureness in terms of relative rotation.

Between each cylindrical surface 5a and 5b and the sliding track 4, the outer race 2 has two small-sized grooves 16a and 16b which form an annular cutout and ease the passage of tools for grinding the sliding track 4 without damaging the striated cylindrical surfaces 5a and 5b machined earlier.

As can be seen more particularly from FIG. 3, the end of the branch 13a of the bearing 11a is not in contact with the edge 17a of the groove 16a. By way of an alternative form, use could be made of the edge 17a of the groove 16a to act as an end stop when force-fitting the bearing 11a.

Thanks to the invention, a freewheel is obtained that can easily be handled without losing components when it is in the subassembly state and which can withstand great variations in temperature before or after assembly, it still being possible for the bearings to be force-fitted satisfactorily on their race.

What is claimed is:

1. A freewheel device (1) with a freewheel intended to be inserted between an outer cylindrical surface of an inner race (3) and a bore of an outer race (2), and said freewheel device comprising a number of wedging cams (7) held, between sliding tracks of the races, by a cage (8) which has windows for the cams, and at least one holding member (11a) capable of maintaining concentricity and transmitting radial loadings between the races while being force-fitted onto a cylindrical bearing surface (5a) of a first of the races and in sliding contact with a cylindrical bearing surface (3a) of a second of the races, wherein there are roughnesses (15) where the first race and the holding member contact.

2. The freewheel device as claimed in claim 1, wherein the cylindrical bearing surface (5a) of the first race has roughnesses.

3. The freewheel device as claimed in claim 2, wherein the cylindrical bearing surface that has roughnesses of the first race has a different diameter than the sliding track of said first race and is separated from the latter by an annular cutout.

4. The freewheel device as claimed in claim 1, wherein the holding member comprises a cylindrical bearing surface that has roughnesses in contact with the cylindrical bearing surface of the first race.

5. The freewheel device as claimed in claim 1, wherein the bore of the outer race (2) includes a cylindrical bearing surface with roughness.

6. The freewheel device as claimed in claim 1, wherein the outer cylindrical surface of the inner race is the cylindrical bearing surface with roughness and said roughnesses are comprised of a pattern imprint formed solely by plastic deformation.

7. The freewheel device as claimed in claim 1, wherein the roughnesses (15) consist of parallel and axial striations.

8. The freewheel device as claimed in claim 1, wherein the roughnesses consist of criss-crossed striations.

9. The freewheel device as claimed in claim 1, wherein said first race and said holding member have different hardness levels and the roughness are on a hardest of said first race and said holding member.

10. The freewheel device as claimed in claim 1, wherein the roughnesses are obtained by knurling.

11. The freewheel device as claimed in claim 2, wherein the holding member comprises a cylindrical bearing surface that has roughnesses in contact with the cylindrical bearing surface of the first race.

12. The freewheel device as claimed in claim 3, wherein the holding member comprises a cylindrical bearing surface that has roughnesses in contact with the cylindrical bearing surface of the first race.

13. The freewheel device as claimed in claim 2, wherein the cylindrical bearing surface with roughnesses is on an outer cylindrical surface of the inner race.

14. The freewheel device as claimed in claim 4, wherein the outer cylindrical surface of the inner race has a cylindrical bearing surface with roughnesses which are received by roughnesses of the holding member.

15. The freewheel device as claimed in claim 2, wherein the roughnesses consist of crossed striations.

16. The freewheel device as claimed in claim 3, wherein the roughnesses consist of crossed striations.

17. The freewheel device as claimed in claim 4, wherein the roughnesses consist of crossed striations.

18. The freewheel device as claimed in claim 5, wherein the roughnesses consist of criss-crossed striations.

19. The freewheel device as claimed in claim 6, wherein the roughnesses consist of criss-crossed striations.

20. The freewheel device as recited in claim 1, wherein each of said first race and holding member have roughnesses formed therein prior to coming in contact such that there is mutual deformation and adaption of respective contact surfaces during force fitting.

21. A freewheel assembly comprising an inner race, an outer race, and a freewheel intended to be inserted between an outer cylindrical surface of the inner race (3) and a bore of the outer race (2), said freewheel comprising a number of wedging cams (7) for providing torque transmission when in a torque transmission state, said wedging cams being held, between sliding tracks of the races, by a cage (8) which has windows for the cams, and at least one holding member (11a) capable of maintaining concentricity and transmitting radial loadings between said races while being force-fitted onto a cylindrical bearing surface (5a) of a first of the races and in sliding or non-torque transmitting contact with a cylindrical bearing surface (3a) of a second of said races, wherein there are roughnesses (15) where the first race and the holding member contact, and wherein the cylindrical bearing surface of the first race has roughnesses.

22. A freewheel assembly comprising an inner race, an outer race, and a freewheel (1) intended to be inserted between an outer cylindrical surface of the inner race (3) and a bore of the outer race (2), of the type comprising a number of wedging cams (7) held, between sliding tracks of the races, by a cage (8) which has windows for the cams, and at least one holding member (11a) capable of maintaining concentricity and transmitting radial loadings between said races while being force-fitted onto a cylindrical bearing surface (5a) of a first of the races and in sliding contact with a cylindrical bearing surface (3a) of a second of said races, wherein there are roughnesses (15) where the first race and the holding member contact, and wherein the cylindrical bearing surface of the first race has roughnesses, and wherein the bore of the outer race (2) includes a cylindrical bearing surface with roughness.

23. A freewheel sub-assembly comprising a first race having a cylindrical surface and a freewheel, said freewheel intended to be inserted between outer cylindrical surface of an inner race and a bore of an outer race, said freewheel comprising:

a number of wedging cams arranged between sliding tracks of the races, a cage which has windows for the cams, the cage holding the cams, and at least one holding member force-fitted onto a cylindrical bearing surface of the first race, roughnesses being provided where the first race and the holding member contact, with said roughnesses being comprised of a pattern imprint which imprint is formed by plastic deformation, with said holding member being capable, when in operation, of maintaining concentricity and transmitting radial loadings between said races while being in sliding contact with a cylindrical bearing surface of the other race.

24. The freewheel sub-assembly as claimed in claim 23, wherein the cylindrical bearing surface that has roughnesses of the first race has a different diameter than the sliding track of said first race and is separated from the latter by an annular cutout.

25. The freewheel sub-assembly as claimed in claim 23 wherein said first race is formed of a harder material than said holding member such that said roughnesses extend into softer material of said holding member.

26. The freewheel sub-assembly as claimed in claim 23, wherein the roughnesses (15) includes parallel and axial striations.

27. The freewheel sub-assembly as claimed in claim 23, wherein the roughnesses includes criss-crossed striations.

28. The freewheel sub-assembly as claimed in claim 23, wherein the holding member comprises a cylindrical bearing surface that has roughnesses in contact with the cylindrical bearing surface of the first race.

29. A freewheel assembly comprising:

an inner race having an outer cylindrical surface;

an outer race having a bore, and a freewheel inserted between the outer cylindrical surface of the inner race and the bore of the outer race, the freewheel comprising:

a number of wedging cams arranged between sliding tracks of the races;

at least one cage which has windows for the cams, the cage holding the cams, and at least one holding member force-fitted onto a cylindrical bearing surface of a first of the races, roughnesses being provided where the first race and the holding member contact, said roughnesses including striations or spikes formed on at least one of said first race and holding member which during a force-fitting; said striations or spikes form an imprint through plastic deformation and adaption in an opposing contact surface of an opposing one of said first race and holding member, and said at least one holding member being capable of maintaining concentricity and transmitting radial loadings between said races while being in sliding contact with a cylindrical bearing surface of a second of said races.

30. The freewheel assembly as claimed in claim 29, wherein the outer cylindrical surface of the inner race is a cylindrical bearing surface with roughnesses.

31. The freewheel assembly as claimed in claim 29, wherein the roughnesses are on said first race which is of a harder material than said holding member.

32. The freewheel assembly as claimed in claim 29, wherein the holding member comprises a cylindrical bearing surface that has roughnesses in contact with the cylindrical bearing surface of the first race.

33. The freewheel assembly as claimed in claim 29, wherein the cylindrical bearing surface with roughnesses is on the bore of the outer surface.

34. The freewheel assembly as claimed in claim 29, wherein the roughnesses consist of criss-crossed striations.

35. The freewheel assembly as recited in claim 29 comprises a pair of holding members axially spaced apart and each having a first surface force-fitted onto a respective cylindrical bearing surface of the first of said races and each having a second surface in sliding contact with a cylindrical bearing surface of said second race with said roughnesses being dimensioned and arranged to avoid relative slippage during handling and with said cams being arranged to provide a torque transmission function when in a torque transmission mode.

* * * * *